US011390302B2

United States Patent
Toda et al.

(10) Patent No.: US 11,390,302 B2
(45) Date of Patent: Jul. 19, 2022

(54) VEHICLE CONTROL DEVICE, VEHICLE CONTROL METHOD, AND PROGRAM

(71) Applicant: HONDA MOTOR CO., LTD., Tokyo (JP)

(72) Inventors: Akihiro Toda, Wako (JP); Yugo Ueda, Wako (JP); Katsuaki Sasaki, Wako (JP); Atsushi Arai, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 93 days.

(21) Appl. No.: 16/647,028

(22) PCT Filed: Oct. 2, 2017

(86) PCT No.: PCT/JP2017/035799
§ 371 (c)(1),
(2) Date: Mar. 13, 2020

(87) PCT Pub. No.: WO2019/069347
PCT Pub. Date: Apr. 11, 2019

(65) Prior Publication Data
US 2020/0223452 A1    Jul. 16, 2020

(51) Int. Cl.
*B60W 60/00*    (2020.01)
*B60W 10/04*    (2006.01)
(Continued)

(52) U.S. Cl.
CPC ........ *B60W 60/0051* (2020.02); *B60W 10/04* (2013.01); *B60W 10/20* (2013.01);
(Continued)

(58) Field of Classification Search
CPC .. B60W 60/0051; B60W 10/04; B60W 10/20; B60W 30/09; B60W 50/08;
(Continued)

(56) References Cited

U.S. PATENT DOCUMENTS

| | | | |
|---|---|---|---|
| 2015/0160653 A1* | 6/2015 | Cheatham, III | B60W 30/0956 701/23 |
| 2017/0235307 A1* | 8/2017 | Asakura | B60W 40/12 701/23 |
| 2018/0208211 A1* | 7/2018 | Chiba | B60W 50/08 |

FOREIGN PATENT DOCUMENTS

| | | |
|---|---|---|
| JP | 2003-269966 | 9/2003 |
| JP | 2008-181328 | 8/2008 |

(Continued)

OTHER PUBLICATIONS

International Search Report and Written Opinion for International Application No. PCT/JP2017/035799 dated Dec. 12, 2017, 9 pages.

*Primary Examiner* — Elaine Gort
*Assistant Examiner* — Ellis B. Ramirez
(74) *Attorney, Agent, or Firm* — Amin, Turocy & Watson, LLP

(57) ABSTRACT

A vehicle control device includes: a driving controller configured to perform first driving control such that one or both of an acceleration or deceleration speed and steering of a vehicle is controlled to travel the vehicle; an occupant intention detector configured to detect an intention of the occupant to switch from manual driving to a state in which the driving controller performs the first driving control; and a one-way traffic determiner configured to determine whether a road on which the vehicle is predicted to be traveling or travel in future is a one-way traffic road. The driving controller determines whether to start the first driving control based on whether the one-way traffic determiner determines the road on which the vehicle is predicted to be traveling or travel in future is the one-way traffic road.

5 Claims, 10 Drawing Sheets

(51) Int. Cl.
  *B60W 10/20* (2006.01)
  *B60W 30/09* (2012.01)
  *B60W 50/14* (2020.01)
  *G05D 1/00* (2006.01)
  *G05D 1/02* (2020.01)

(52) U.S. Cl.
  CPC ............ *B60W 30/09* (2013.01); *B60W 50/14* (2013.01); *B60W 2520/06* (2013.01); *B60W 2710/20* (2013.01); *B60W 2720/106* (2013.01); *B60W 2720/125* (2013.01); *G05D 1/0088* (2013.01); *G05D 1/0212* (2013.01)

(58) Field of Classification Search
  CPC ............ B60W 50/14; B60W 2520/06; B60W 2710/20; B60W 2720/106; B60W 2720/125; B60W 60/0061; B60W 50/0097; B60W 30/18036; B60W 30/0956; G05D 1/0088; G05D 1/0212; G08G 1/09
  USPC .......... 701/26, 41, 48, 60, 65; 340/465, 466, 340/467; 342/69, 71
  See application file for complete search history.

(56) References Cited

FOREIGN PATENT DOCUMENTS

| | | | |
|---|---|---|---|
| JP | 2011-022828 | | 2/2011 |
| JP | 2011022828 A | * | 2/2011 |
| JP | 2011044109 A | * | 3/2011 |
| JP | 2017-007596 | | 1/2017 |
| JP | 2017-073073 | | 4/2017 |
| KR | 20130120695 A | * | 11/2013 |

* cited by examiner

VEHICLE CONTROL DEVICE, VEHICLE CONTROL METHOD, AND PROGRAM

TECHNICAL FIELD

The present invention relates to a vehicle control device, a vehicle control method, and a program.

BACKGROUND ART

In the related art, a technology for recognizing an indicator such as a traffic sign indicating one-way traffic from a captured image captured with a camera that images the outside of a vehicle, determining a direction in which travel of a vehicle is prohibited based on the recognized indicator, and warning a driver when a driving operation of the driver in which a vehicle is predicted to travel in the prohibited direction is detected is known (see Patent Literature 1).

CITATION LIST

Patent Literature

[Patent Literature 1]
Japanese Unexamined Patent Application, First Publication No. 2017-73073

SUMMARY OF INVENTION

Technical Problem

However, in the technology of the related art, no consideration is not given to determine whether to start automated driving due to a road on which a travel direction of a vehicle is restricted.

The present invention is devised in view of such circumstances and an objective of the present invention is to provide a vehicle control device, a vehicle control method, and a program capable of determining whether to start automated driving more appropriately.

Solution to Problem (1) A vehicle control device (100) includes: a driving controller (127, 130, 140, 160) configured to perform first driving control such that one or both of an acceleration or deceleration speed and steering of a vehicle (an own vehicle M) is controlled to travel the vehicle irrespective of an operation of an occupant of the vehicle; an occupant intention detector (126) configured to detect an intention of the occupant to switch from manual driving to a state in which the driving controller performs the first driving control; and a one-way traffic determiner (132) configured to determine whether a road on which the vehicle is predicted to be traveling or travel in future is a one-way traffic road. The driving controller determines whether to start the first driving control based on whether the one-way traffic determiner determines the road on which the vehicle is predicted to be traveling or travel in future is the one-way traffic road when the occupant intention detector detects the intention of the occupant to switch to the state in which the driving controller performs the first driving control.

(2) In the aspect (1), the one-way traffic determiner may further determine whether the vehicle is traveling in a reverse direction or travels in the reverse direction in future on the one-way traffic road. The driving controller may not start the first driving control when the one-way traffic determiner determines that the vehicle is traveling in the reverse direction or travels in the reverse direction in future on the one-way traffic road.

(3) In the aspect (2), the vehicle control device may further include a notifier (30, 128) configured to notify the occupant that the first driving control is not started when the driving controller determines not to start the first driving control due to the determination that the vehicle is traveling in the reverse direction on the one-way traffic road.

(4) In any one of the aspects (1) to (3), even in a case in which the first driving control is set to start automatically at a time point at which a manual driving operation by the occupant ends, the driving controller may not start the first driving control when the one-way traffic determiner determines that the road on which the vehicle is predicted to be traveling or travel in future is the one-way traffic road and determines that the vehicle is traveling or travels in future is the one-way traffic road.

(5) In any one of the aspects (1) to (4), when the driving controller determines that the first driving control does not start due to the determination that the vehicle is traveling in the reverse direction on the one-way traffic road, the driving controller may perform second driving control such that a contact between the vehicle and an object is avoided.

(6) A vehicle control device includes: a driving controller configured to perform first driving control such that one or both of an acceleration or deceleration speed and steering of a vehicle is controlled to travel the vehicle irrespective of an operation of an occupant of the vehicle; an occupant intention detector configured to detect an intention of the occupant to switch from manual driving to a state in which the driving controller performs the first driving control; and a determiner configured to determine whether the vehicle is traveling in a reverse direction or travels in the reverse direction in future. The driving controller determines whether to start the first driving control based on whether for the determiner to determine whether the vehicle is traveling in the reverse direction or travels in the reverse direction in future when the occupant intention detector detects the intention of the occupant to switch to the state in which the driving controller performs the first driving control.

(7) A vehicle control method includes: performing, by a driving controller, first driving control such that one or both of an acceleration or deceleration speed and steering of a vehicle is controlled to travel the vehicle irrespective of an operation of an occupant of the vehicle; detecting, by an occupant intention detector, an intention of the occupant to switch from manual driving to a state in which the driving controller performs the first driving control; determining, by a one-way traffic determiner, whether a road on which the vehicle is predicted to be traveling or travel in future is a one-way traffic road; and further determining, by the driving controller, whether to start the first driving control based on whether the one-way traffic determiner determines the road on which the vehicle is predicted to be traveling or travel in future is the one-way traffic road when the intention of the occupant to switch to the state in which the driving controller performs the first driving control is detected.

(8) A non-transitory computer-readable storage medium that stores a program to be executed by a vehicle computer to perform at least: perform first driving control such that one or both of an acceleration or deceleration speed and steering of a vehicle is controlled to travel the vehicle irrespective of an operation of an occupant of the vehicle, detect an intention of the occupant to switch from manual driving to a state in which the driving controller performs the first driving control; determine whether a road on which the vehicle is predicted to be traveling or travel in future is a one-way traffic road; and determine whether to start the first driving control based on whether to determine whether the road on which the vehicle is predicted to be traveling or travel in future is the one-way traffic road when the intention of the occupant to switch to the state in which the driving controller performs the first driving control is detected.

Advantageous Effects of Invention

According to the aspects (1) to (8), it is possible to determine whether to start automated driving more appropriately.

DESCRIPTION OF EMBODIMENTS

Hereinafter, embodiments of a vehicle control device, a vehicle control method, and a program according to the present invention will be described with reference to the drawings.

[Overall Configuration]

Figure 1:
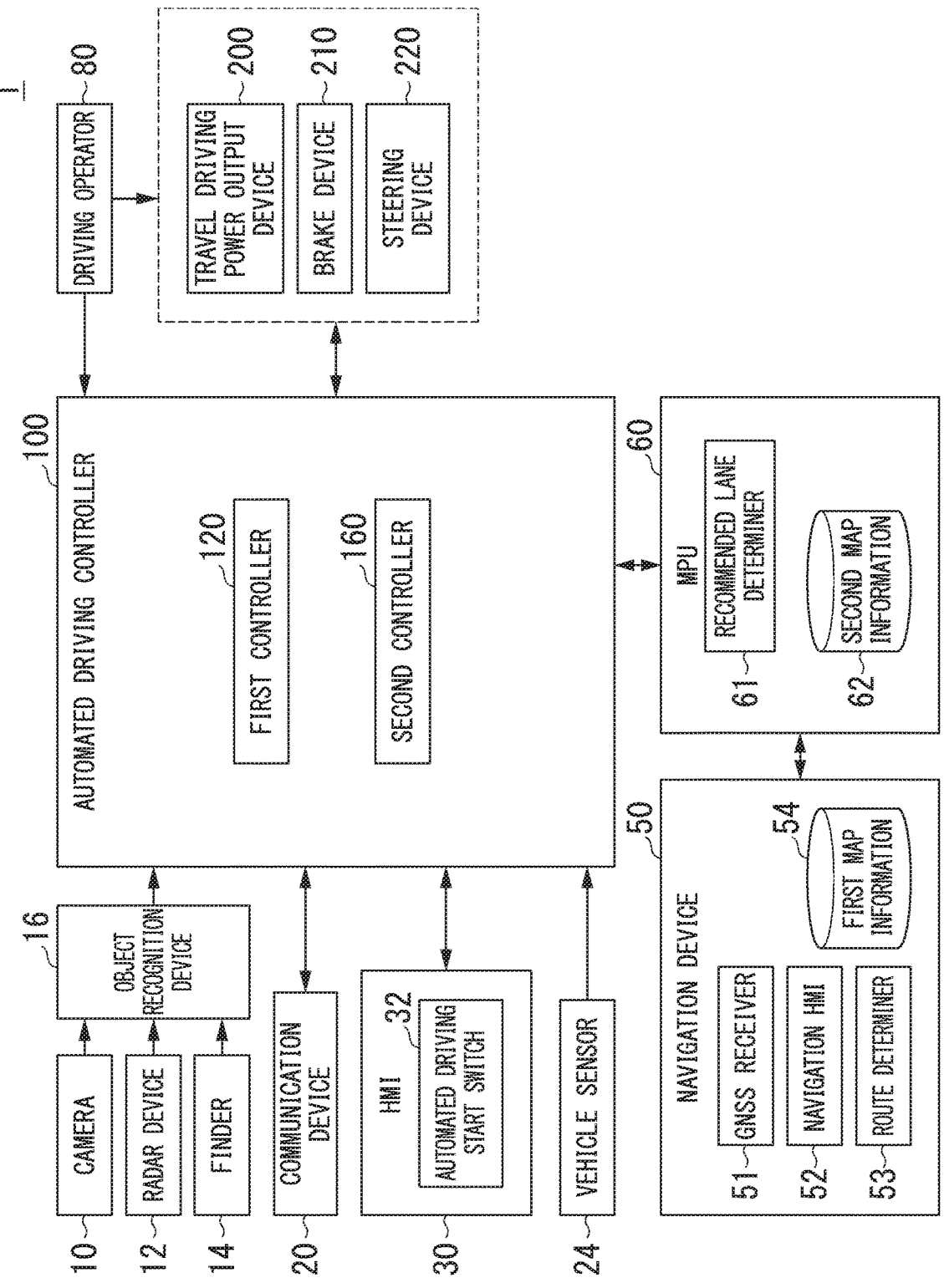
FIG. 1 is a diagram illustrating a configuration of a vehicle system 1 in which a vehicle control device according to an embodiment is used.

FIG. 1 is a diagram illustrating configuration of a vehicle system 1 in which a vehicle control device according to an embodiment is used. A vehicle in which the vehicle system 1 is mounted is, for example, a vehicle such as a two-wheeled vehicle, a three-wheeled vehicle, or a four-wheeled vehicle. A driving source of the vehicle includes an internal combustion engine such as a diesel engine or a gasoline engine, or an electric motor, and a combination thereof. When the electric motor is included, the electric motor operates using power generated by a power generator connected to the internal combustion engine or power discharged from a secondary cell or a fuel cell.

The vehicle system 1 includes, for example, a camera 10, a radar device 12, a finder 14, an object recognition device 16, a communication device 20, a human machine interface (HMI) 30, a vehicle sensor 40, a navigation device 50, a map positioning unit (MPU) 60, a driving operator 80, an automated driving controller (an example of a vehicle control device) 100, a travel driving power output device 200, a brake device 210, and a steering device 220. The devices and units are connected to each other via a multiplex communication line such as a controller area network (CAN) communication line, a serial communication line, or a wireless communication network. The configuration shown in FIG. 1 is merely exemplary, a part of the configuration may be omitted, and another configuration may be further added.

The camera 10 is, for example, a digital camera that uses a solid-state image sensor such as a charged coupled device (CCD) or a complementary metal oxide semiconductor (CMOS). The camera 10 is mounted on one portion or a plurality of portions of a vehicle in which the vehicle system 1 is mounted (hereinafter referred to as an own vehicle M). When the camera 10 images a front side, the camera 10 is mounted on an upper portion of a front windshield, a rear surface of a rearview mirror, and the like. For example, the camera 10 repeatedly images the surroundings of the own vehicle M periodically. The camera 10 may be a stereo camera.

The radar device 12 radiates radio waves such as millimeter waves to the surroundings of the own vehicle M and detects radio waves (reflected waves) reflected from an object to detect at least a position (a distance and an azimuth) of the object. The radar device 12 is mounted on any one portion or a plurality of portions of the own vehicle M. The radar device 12 may detect a position and a speed of an object in conformity with a frequency modulated continuous wave (FM-CW) scheme.

The finder 14 is a light detection and ranging (LIDAR) finder. The finder 14 radiates light to the surroundings of the own vehicle M and measures scattered light. The finder 14 detects a distance to a target based on a time from light emission to light reception. The radiated light is, for example, pulsed laser light. The finder 14 is mounted on any one portion or a plurality of portions of the own vehicle M.

The object recognition device 16 performs a sensor fusion process on detection results from some or all of the camera 10, the radar device 12, and the finder 14 and recognizes a position, a type, a speed, and the like of an object. The object recognition device 16 outputs a recognition result to the automated driving controller 100. The object recognition device 16 may output detection results of the camera 10, the radar device 12, and the finder 14 to the automated driving controller 100 without any change, as necessary.

The communication device 20 communicates with, for example, other vehicles near the own vehicle M or various server devices via a wireless base station, for example, using a cellular network, a Wi-Fi network, Bluetooth (registered trademark), or dedicated short range communication (DSRC).

The HMI 30 presents various types of information to an occupant of the own vehicle M and receives input operations by the occupant. The HMI 30 includes various display devices, speakers, buzzers, touch panels, switches, and keys.

The HMI 30 includes, for example, an automated driving start switch 32. The automated driving start switch 32 is a switch for allowing the automated driving controller 100 to start automated driving control. The automated driving control controls one or both of an accelerated or decelerated speed and steering of the own vehicle M to travel the own vehicle M irrespective of an operation by the occupant of the own vehicle M. On the other hand, when the automated driving start switch 32 is not operated, that is, when the automated driving controller 100 does not perform the automated driving control, manual driving is performed. In the manual driving, the travel driving power output device 200, the brake device 210, and the steering device 220 are controlled in accordance with an operation amount of the driving operator 80 by the occupant. In the present specification, a state in which driving support such as adaptive cruise control (ACC) or lane keeping assist (LKAS) is performed is assumed to be a state in which the manual driving is performed. The automated driving start switch 32 may be a switch for ending the automated driving control which is being performed by the automated driving controller 100.

The vehicle sensor 40 includes a vehicle speed sensor that detects a speed of the own vehicle M, an acceleration sensor that detects acceleration, a yaw rate sensor that detects angular velocity around a vertical axis, and an azimuth sensor that detects a direction of the own vehicle M.

The navigation device 50 includes, for example, a global navigation satellite system (GNSS) receiver 51, a navigation HMI 52, and a route determiner 53 and retains first map information 54 in a storage device such as a hard disk drive (HDD) or a flash memory. The GNSS receiver 51 specifies a position of the own vehicle M based on signals received from GNSS satellites. The position of the own vehicle M may be specified or complemented by an inertial navigation system (INS) using an output of the vehicle sensor 40. The navigation HMI 52 includes a display device, a speaker, a touch panel, and a key. The navigation HMI 52 may be partially or entirely common to the above-described HMI 30. The route determiner 53 determines, for example, a route from a position of the own vehicle M specified by the GNSS receiver 51 (or any input position) to a destination input by the occupant using the navigation HMI 52 (hereinafter referred to as a route on a map) with reference to the first map information 54. The first map information 54 is, for example, information in which a road shape is expressed by links indicating roads and nodes connected by the links. The first map information 54 may include curvatures of roads and point of interest (POI) information or the like. The route on the map determined by the route determiner 53 is output to the MPU 60. The navigation device 50 may perform route guidance using the navigation HMI 52 based on the route on the map determined by the route determiner 53. The navigation device 50 may be realized by, for example, a function of the terminal device such as a smartphone or a tablet terminal owned by the occupant. The navigation device 50 may transmit a present position and a destination to a navigation server via the communication device 20 to acquire the route on the map responded from the navigation server.

The MPU 60 functions as, for example, a recommended lane determiner 61 and retains second map information 62 in a storage device such as an HDD or a flash memory. The recommended lane determiner 61 divides the route provided from the navigation device 50 into a plurality of blocks (for example, divides the route in a vehicle movement direction for each 100 [m]) and determines a recommended lane for each block with reference to the second map information 62. The recommended lane determiner 61 determines in which lane the vehicle travels from the left. When there is a branching location, a joining location, or the like in the route, the recommended lane determiner 61 determines a recommended lane so that the own vehicle M can travel in a reasonable route to move to a branching destination.

The second map information 62 is map information that has higher precision than the first map information 54. The second map information 62 includes, for example, information regarding the middles of lanes or information regarding boundaries of lanes. The second map information 62 may include road information, traffic regulation information, address information (address and postal number), facility information, and telephone number information. The second map information 62 may be updated frequently by accessing another device using the communication device 20.

The driving operator 80 includes, for example, an accelerator pedal, a brake pedal, a shift lever, a steering wheel, a steering variant, a joystick, and other manipulators. A sensor that detects whether there is a manipulation or a manipulation amount is mounted on the driving operator 80. A detection result is output to the automated driving controller 100, the travel driving power output device 200, or one or both of the brake device 210 and the steering device 220.

The automated driving controller 100 includes, for example, a first controller 120 and a second controller 160. Each of the first controller 120 and the second controller 160 is realized, for example, by causing a hardware processor such as a central processing unit (CPU) to execute a program (software). Some or all of the constituent elements may be realized by hardware (a circuit unit including circuitry) such as a large scale integration (LSI), an application specific integrated circuit (ASIC), a field-programmable gate array (FPGA), or a graphics processing unit (GPU) or may be realized by software and hardware in cooperation.

Figure 2:
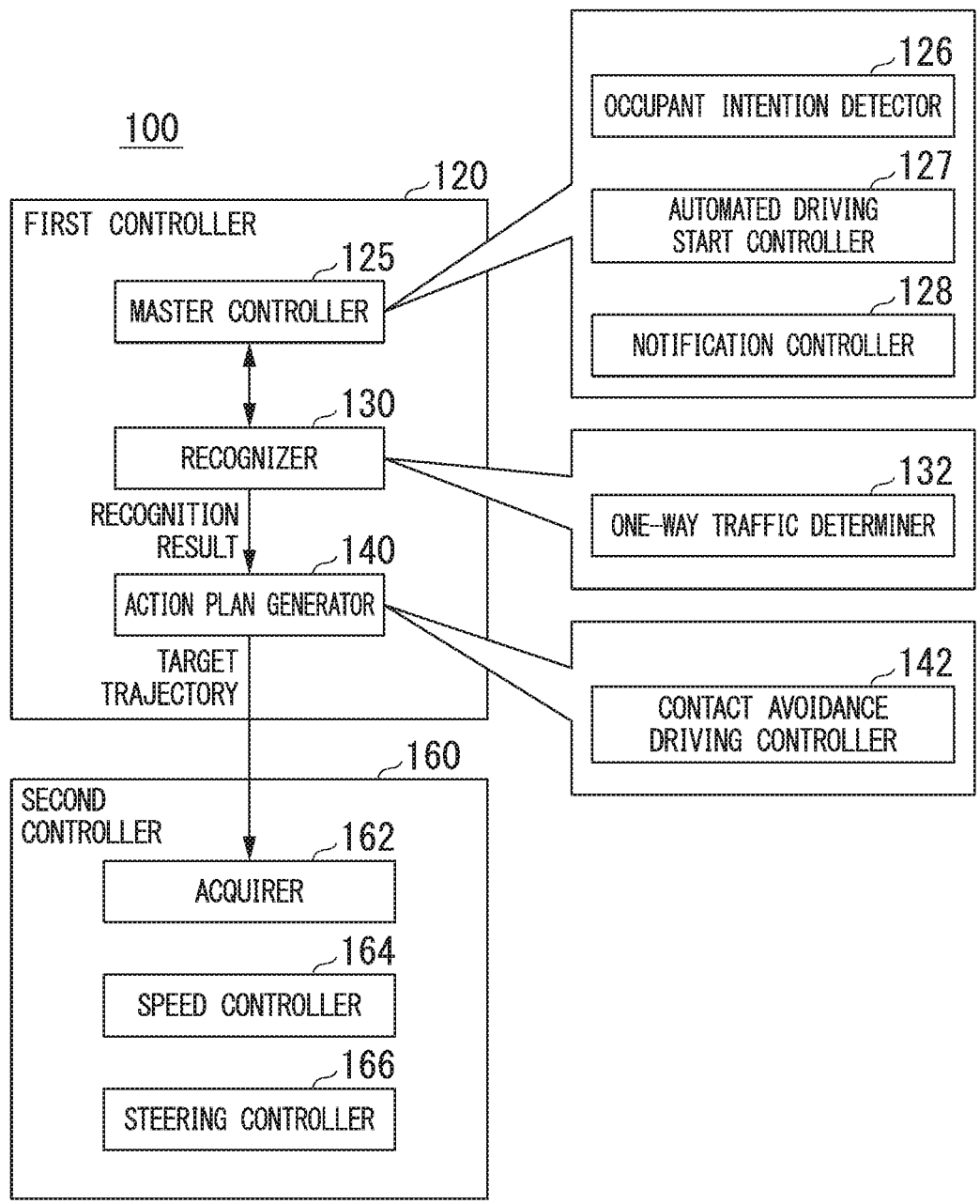
FIG. 2 is a diagram illustrating functional configurations of a first controller 120 and a second controller 160.

FIG. 2 is a diagram illustrating a functional configuration of the first controller 120 and the second controller 160. The first controller 120 includes, for example, a master controller 125, a recognizer 130, and an action plan generator 140. A combination of an automated driving start controller 127, a recognizer 130, an action plan generator 140, and a second controller 160 included in the master controller 125 is an example of a "driving controller."

The first controller 120 realizes, for example, a function by artificial intelligence (AI) and a function by a model given in advance in parallel. For example, a function of "recognizing an intersection" may be realized by performing recognition of an intersection in accordance with an image recognition technique using deep learning or the like and recognition based on a condition given in advance (a signal, a road sign, or the like which can be subjected to pattern matching) in parallel, scoring both the recognitions, and performing evaluation comprehensively. Thus, reliability of automated driving is guaranteed.

The master controller 125 performs control or the like such that whether the automated driving control of the own vehicle M is determined to start based on operation instruction content by an occupant, a recognition result by the recognizer 130, or the like or an occupant is notified of a determination result. The details of the function of the master controller 125 will be described later.

The recognizer 130 recognizes states such as a position, a speed, acceleration, or the like of an object near the own vehicle M based on information input from the camera 10, the radar device 12, and the finder 14 via the object recognition device 16. For example, the position of the object is recognized as a position on the absolute coordinates in which a representative point (a center of gravity, a center of a driving shaft, or the like) of the own vehicle M is the origin and is used for control. The position of the object may be represented as a representative point such as a center of gravity, a corner, or the like of the object or may be represented as expressed regions. A "state" of an object may include acceleration or jerk of the object or an "action state" (for example, whether a vehicle is changing a lane or is attempting to change the lane). The recognizer 130 recognizes the shape of a curve in which the own vehicle M passes from now based on the image captured by the camera 10. The recognizer 130 converts the shape of a curve into a real plane from an image captured by the camera 10 and outputs 2-dimensional point sequence information or information expressed, for example, using the same model as the 2-dimensional point sequence information as information indicating the shape of the curve to the action plan generator 140.

The recognizer 130 recognizes a lane in which the own vehicle M is traveling (a travel lane). For example, the recognizer 130 recognizes the travel lane by comparing patterns of road mark lines (for example, arrangement of continuous lines and broken lines) obtained from the second map information 62 with patterns of road mark lines around the own vehicle M recognized from images captured by the camera 10. The recognizer 130 may recognize a travel lane by mainly recognizing runway boundaries (road boundaries) including road mark lines or shoulders, curbstones, median strips, and guardrails without being limited to road mark lines. In this recognition, the position of the own vehicle M acquired from the navigation device 50 or a process result by INS may be added. The recognizer 130 recognizes temporary stop lines, obstacles such as oncoming vehicles, red signals, toll gates, entrance gates of parking lots, and other road events.

The recognizer 130 recognizes a position or a posture of the own vehicle M with respect to the travel lane when the recognizer 130 recognizes the travel lane. For example, the recognizer 130 may recognize a deviation from the middle of a lane of a standard point of the own vehicle M and an angle formed with a line extending along the middle of a lane and the travel direction of the own vehicle M as a relative position and posture of the own vehicle M to the travel lane. Instead of this, the recognizer 130 may recognize a position or the like of the standard point of the own vehicle M with respect to a side end portion (a road mark line or a road boundary) of any travel lane as the relative position of the own vehicle M to the travel lane.

The recognizer 130 may derive recognition precision in the foregoing recognition process and output the recognition precision as recognition precision information to the action plan generator 140. For example, the recognizer 130 generates the recognition precision information based on a frequency at which a road demarcation line can be recognized for a given period. The details of the function of the recognizer 130 will be described later.

The action plan generator 140 determines events which are sequentially performed in the automated driving so that the own vehicle M is traveling along a recommended lane determined by the recommended lane determiner 61 and handles a surrounding situation of the own vehicle M in principle. The events include, for example, a constant speed traveling event in which a vehicle travels in the same travel lane at a constant speed, a following travel event in which a vehicle follows a front vehicle, an overtaking event in which a vehicle overtakes a front vehicle, an avoiding event in which braking and/or steering is performed to avoid approach to an obstacle, a curve travel event in which a vehicle performs curve traveling, a passage event in which a vehicle passes through a predetermined point such as an intersection, a crosswalk, or a crossing, a lane changing event, a joining event, a branching event, an automated stopping event, and a takeover event in which automated driving ends to switch to manual driving.

The action plan generator 140 generates a target trajectory in which the own vehicle M travels in future in accordance with an activated event. The details of each functional unit will be described later. The target trajectory includes, for example, a speed element. For example, the target trajectory is expressed by sequentially arranging spots (trajectory points) at which the own vehicle M will arrive. The trajectory point is a spot at which the own vehicle M will arrive for each predetermined travel distance (for example, about several [m]) in a distance along a road. Apart from the trajectory point, target acceleration and a target speed are generated as a part of the target trajectory for each of predetermined sampling times (for example, about a decimal point of a second). The trajectory point may be a position at which the own vehicle M will arrive at the sampling time for each predetermined sampling time. In this case, information regarding the target acceleration or the target speed is expressed according to an interval between the trajectory points.

Figure 3:
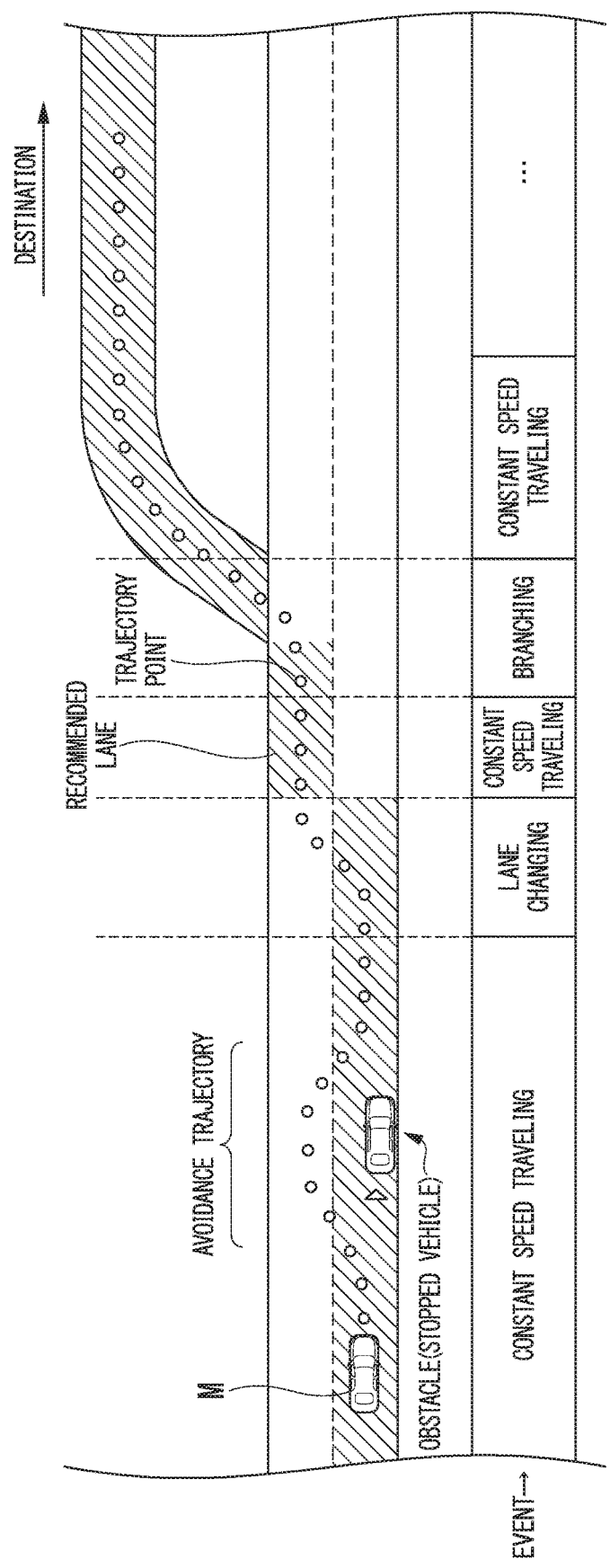
FIG. 3 is a diagram illustrating an aspect in which a target trajectory is generated based on a recommended lane.

FIG. 3 is a diagram illustrating an aspect in which a target trajectory is generated based on a recommended lane. As illustrated, the recommended lane is set so that it is convenient to travel along a route to a destination. When a vehicle approaches in front by a predetermined distance (which may be determined in accordance with a kind of event) of a switch spot of the recommended lane, the action plan generator 140 activates the passage event, the lane changing event, the branching event, the joining event, or the like. When it is necessary to avoid an obstacle during performing each event, an avoidance trajectory is generated, as illustrated. The details of the action plan generator 140 will be described later.

The second controller 160 controls the travel driving power output device 200, the brake device 210, and the steering device 220 so that the own vehicle M passes along the target trajectory generated by the action plan generator 140 at a scheduled time.

Referring back to FIG. 2, the second controller 160 includes, for example, an acquirer 162, a speed controller 164, and a steering controller 166. The acquirer 162 acquires information regarding the target trajectory (trajectory points) generated by the action plan generator 140 and stores the information in a memory (not illustrated). The speed controller 164 controls the travel driving power output device 200 or the brake device 210 based on a speed element incidental to the target trajectory stored in a memory. The steering controller 166 controls the steering device 220 in accordance with a curve condition of the target trajectory stored in the memory. The processes of the speed controller 164 and the steering controller 166 are realized, for example, by combining feed-forward control and feedback control. For example, the steering controller 166 performs the feed-forward control in accordance with a curvature of a road in front of the own vehicle M and the feedback control based on separation from the target trajectory in combination.

The travel driving power output device 200 outputs travel driving power (torque) for travel of the vehicle to a driving wheel. The travel driving power output device 200 includes, for example, a combination of an internal congestion engine, an electric motor, a transmission, and the like and an ECU that controls them. The ECU controls the foregoing configuration in accordance with information input from the second controller 160 or information input from the driving operator 80.

The brake device 210 includes, for example, a brake caliper, a cylinder that transmits a hydraulic pressure to the brake caliper, an electronic motor that generates a hydraulic pressure to the cylinder, and a brake ECU. The brake ECU controls the electric motor in accordance with information input from the second controller 160 or information input from the driving operator 80 such that a brake torque in accordance with a brake operation is output to each wheel. The brake device 210 may include a mechanism that transmits a hydraulic pressure generated in response to an operation of the brake pedal included in the driving operator 80 to the cylinder via a master cylinder as a backup. The brake device 210 is not limited to the above-described configuration and may be an electronic control type hydraulic brake device that controls an actuator in accordance with information input from the second controller 160 such that a hydraulic pressure of the master cylinder is transmitted to the cylinder.

The steering device 220 includes, for example, a steering ECU and an electric motor. The electric motor works a force to, for example, a rack and pinion mechanism to change a direction of a steering wheel. The steering ECU drives the electric motor to change the direction of the steering wheel in accordance with information input from the second controller 160 or information input from the driving operator 80.

[Details of Functions of Master Controller 125 and Recognizer 130]

Next, the details of functions of the master controller 125 and the recognizer 130 will be described. Referring back to FIG. 2, the master controller 125 includes, for example, an occupant intention detector 126, an automated driving start controller 127, and a notification controller 128. The recognizer 130 includes, for example, a one-way traffic determiner 132. A combination of the notification controller 128, and a display device and a speaker included in the HMI 30 is an example of a "notifier."

The occupant intention detector 126 detects an intention of an occupant to switch from manual driving to automated driving (hereinafter referred to as a "start intention"). For example, the occupant intention detector 126 detects a start intention when an occupant performs an automated driving start operation using the automated driving start switch 32.

The occupant intention detector 126 may determine whether the occupant takes her or his hands off a steering wheel which is an example of the driving operator 80 after the occupant performs the automated driving start operation using the automated driving start switch 32, and may detect the start intention when the occupant intention detector 126 determines that the occupant takes her or his hands off the steering wheel.

The occupant intention detector 126 determines whether the occupant takes her or his hands off, for example, by using a grip sensor provided on the steering wheel. The grip sensor is, for example, an electrostatic capacitive sensor provided in the circumferential direction of the steering wheel. When a value of electrostatic capacitance obtained by the grip sensor is equal to or greater than a predetermined amount, the occupant intention detector 126 determines that the occupant grips the steering wheel. When the value of the electrostatic capacitance is less than the predetermined value, the occupant intention detector 126 determines that the occupant does not grip the steering wheel.

When the occupant intention detector 126 detects the start intention, the automated driving start controller 127 instructs the one-way traffic determiner 132 to determine one-way traffic.

The one-way traffic determiner 132 determines whether a road on which the own vehicle M is predicted to be traveling or travel in future is a one-way traffic based on an instruction from the road automated driving start controller 127. The "future" is, for example, "close future" within 1 [second] to several [seconds].

Figure 4:
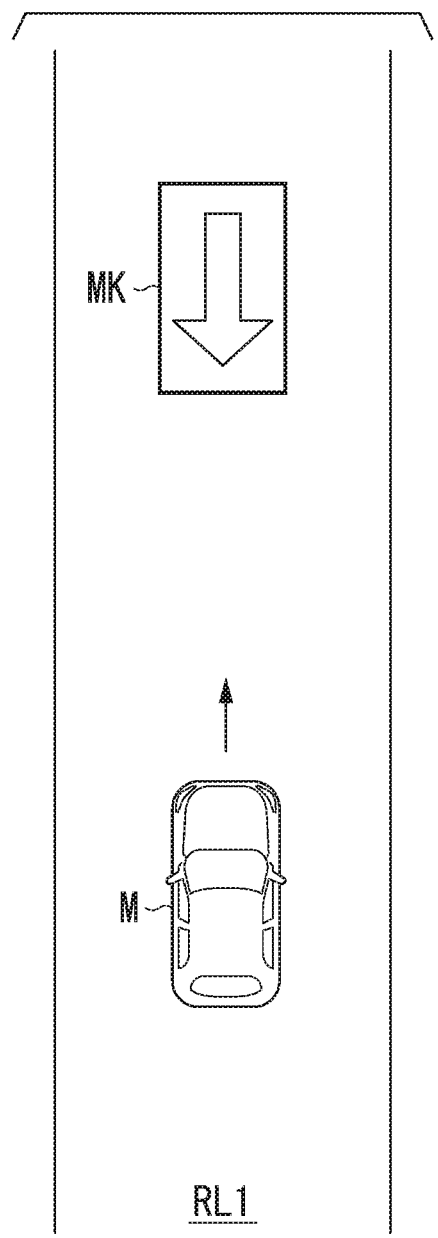
FIG. 4 is a diagram illustrating a technique for determining whether a road on which an own vehicle M is traveling is a one-way traffic road.

FIG. 4 is a diagram illustrating a technique for determining whether a road on which an own vehicle M is traveling is a one-way traffic road. The recognizer 130 recognizes a road link RL1 on which the own vehicle M is traveling, for example, based on an image captured by the camera 10. The road link separates a road between nodes in map information and is generally a road corresponding to one block. The recognizer 130 recognizes a mark MK indicating a travel direction drawn on the road link RL1 based on an image captured by the camera 10. Based on the mark MK recognized by the recognizer 130, the one-way traffic determiner 132 determines whether the road link RL1 is a one-way traffic road.

The one-way traffic determiner 132 determines whether the own vehicle M is traveling in the reverse direction to a travel direction regulated in a road (hereafter referred to as traveling in a reverse direction) based on a travel direction such as an arrow indicated by the mark MK recognized by the recognizer 130 and a direction in which the own vehicle M is traveling. For example, when the travel direction such as the arrow indicated by the mark MK recognized by the recognizer 130 is the same as the direction in which the own vehicle M is traveling, the one-way traffic determiner 132 determines that the own vehicle M is not traveling in the reverse direction with respect to the road link RL1. The same case is, for example, a case in which a direction obtained by projecting the travel direction of the own vehicle M to an axis indicating a lane direction is the same as the travel direction indicated by the mark MK. When the travel direction indicated by the recognized mark MK is not the same as the direction in which the own vehicle M is traveling, it is determined that the own vehicle M is traveling in the reverse direction with respect to the road link RL1.

Based on a recognition result of a road sign installed on a road side of the road link RL1, the one-way traffic determiner 132 may determine whether the road link RL1 is for one-way traffic or whether the own vehicle M is traveling in the reverse direction when the road link RL1 is for one-way traffic.

The one-way traffic determiner 132 may compare the position of the own vehicle M with the first map information 54 or the second map information 62 and may determine whether the road link RL1 is for one-way traffic or whether the own vehicle M is traveling in the reverse direction when the road link RL1 is for one-way traffic.

Figure 5:
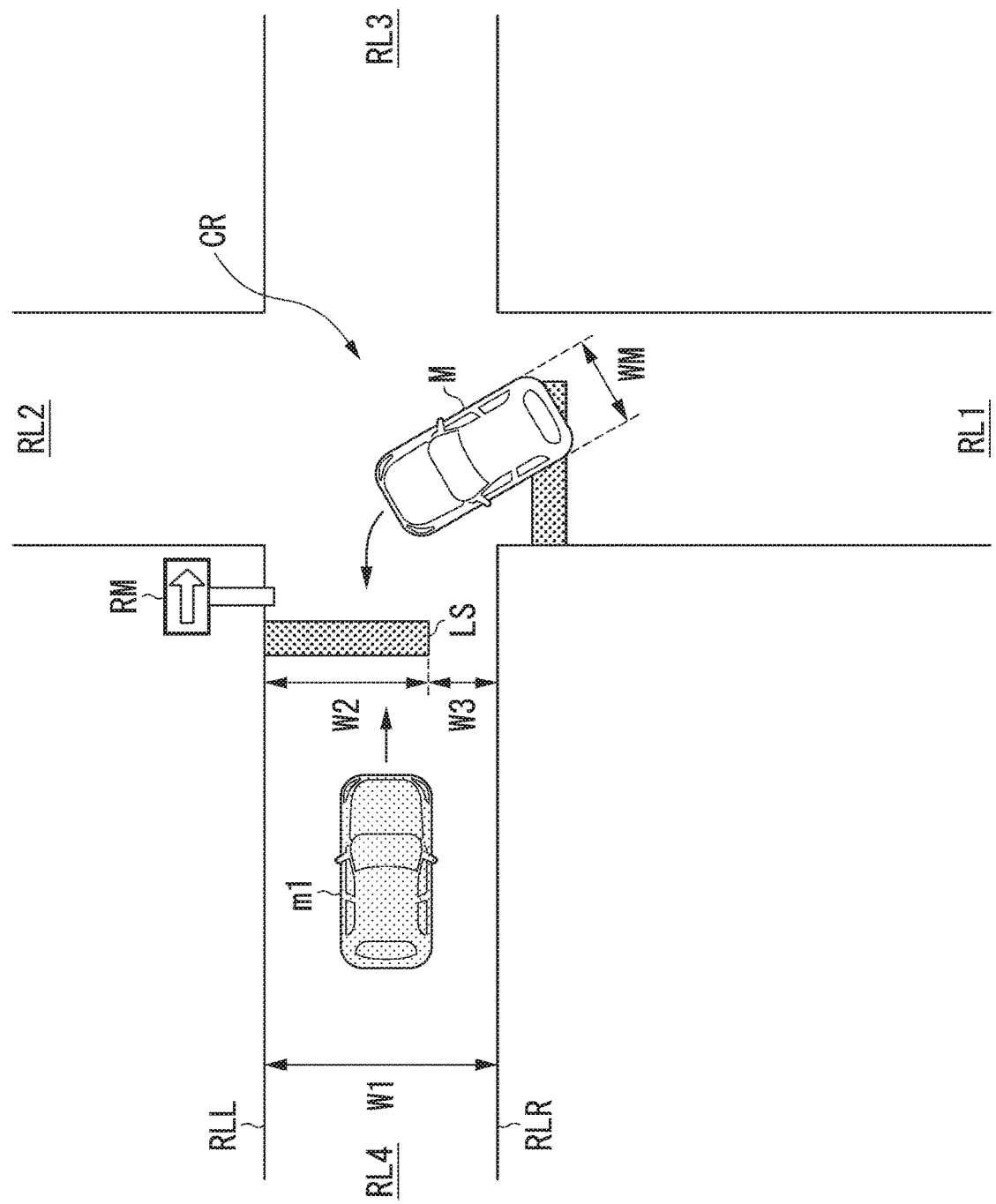
FIG. 5 is a diagram illustrating a technique for determining whether a road on which the own vehicle M is predicted to travel in future is a one-way traffic road.

FIG. 5 is a diagram illustrating a technique for determining whether a road on which the own vehicle M is predicted to travel in future is a one-way traffic road. The example of FIG. 5 shows an intersection CR connected to road links RL1 to RL4. The one-way traffic determiner 132 estimates a road on which the own vehicle M travels in future based on a steering angle or a steering torque amount of the own vehicle M.

The example of FIG. 5 shows an aspect in which the own vehicle M turns left in the intersection CR and is about to enter the road link RL4 from the road link RL1. In this case, in accordance with a steering angle or a steering torque amount of the own vehicle M, the one-way traffic determiner 132 estimates that the road link RL4 is a road on which the own vehicle M travels in future.

Then, based on the road sign RM installed on a road side of the road link RL4 recognized by the recognizer 130, the one-way traffic determiner 132 determines whether the road link RL4 is for one-way traffic. Based on the direction of an arrow indicated by the road sign RM and a direction in which the own vehicle M is traveling, the one-way traffic determiner 132 determines whether the own vehicle M travels in the reverse direction in future.

Based on the position of another vehicle m1 traveling on the road link RL4, the one-way traffic determiner 132 may determine whether the road link RL4 is for one-way traffic. In this case, for example, the one-way traffic determiner 132 determines whether the other vehicle m1 recognized by the recognizer 130 is near the middle of the road link RL4 in the width direction. For example, when the other vehicle m1 is near the middle of the road link RL4 in the width direction, the one-way traffic determiner 132 determines that the road link RL4 is for one-way traffic. Conversely, when the other vehicle m1 is not near the middle of the road link RL4 in the width direction (for example, when the other vehicle m1 is biased to the right road side of the road link RL4 from the own vehicle M), the one-way traffic determiner 132 determines that the road link RL4 is not for one-way traffic.

Based on the direction of the body or the travel direction of the other vehicle m1 recognized by the recognizer 130, the one-way traffic determiner 132 determines whether the own vehicle M is traveling in the reverse direction on the road link RL4. For example, when a direction in which the own vehicle M is predicted to be traveling (a predicted travel direction) is a reverse direction to the direction of the body or the travel direction of the other vehicle m1, the one-way traffic determiner 132 determines that the own vehicle M is traveling in the reverse direction on the road link RL4. Conversely, when the predicted travel direction of the own vehicle M is the same as the direction of the body or the travel direction of the other vehicle m1, the one-way traffic determiner 132 determines that the own vehicle M is not traveling in the reverse direction on the road link RL4.

Based on the length of a stop line LS drawn on the road link RL4, the one-way traffic determiner 132 may determine whether the road link RL4 is for one-way traffic. In this case, the one-way traffic determiner 132 recognizes left and left road demarcation lines RLL and RLR demarcating the travel road link RL4 recognized by the recognizer and recognizes a distance between the recognized road demarcation lines RLL and RLR as a road width W1. When the road demarcation line RLL or RLR cannot be recognized, the recognizer 130 may estimate both ends of the road link RL4 based on a luminance difference or the like in an image and recognize a distance between the predicted ends as a road width W1.

Then, when a width W2 of the stop line LS drawn on the road link RL4 recognized by the recognizer 130 is equal to or greater than a first predetermined value decided using the road width W1 as a standard, the one-way traffic determiner 132 determines that the road link RL4 is for one-way traffic. The first predetermined value is decided, for example, using the road width W1 as the standard. Specifically, the first predetermined value is a length of about 50 [%] of the road width W1.

When a width W3 of an area which is obtained as a difference between the stop line LS and the road width W1 of the road link RL4 and in which there is no stop line is equal to or greater than a second predetermined value, the one-way traffic determiner 132 may determine that the road is not a one-way road. The second predetermined value is, for example, a fixed value determined as a value of about a vehicle width of an ordinary large vehicle (for example, a vehicle WM of the own vehicle M). The second predetermined value may be a fixed value decided as a value of about the width of a pre-decided one lane. When the road link RL4 is for a one-way traffic and it is recognized that the stop line LS is drawn on the side of the intersection CR of the road link RL4, the one-way traffic determiner 132 determines that the own vehicle M is traveling in the reverse direction on the road link RL4.

When the one-way traffic determiner 132 determines that the recommended road on which the own vehicle M is traveling or travel in future is not a one-way traffic road, the automated driving start controller 127 determines that the recognizer 130, the action plan generator 140, and the second controller 160 start the automated driving control. The automated driving control started in the determination by the automated driving start controller 127 is an example of first driving control.

When the one-way traffic determiner 132 determines that the road on which the own vehicle M is predicted to be traveling or travel in future is the one-way traffic road and determines that the own vehicle M is not traveling in the reverse direction on a one-way traffic road and does not travel in the reverse direction on a road on which the own vehicle M is predicted to travel in future, the automated driving start controller 127 determines that the recognizer 130, the action plan generator 140, and the second controller 160 start the automated driving control.

When the one-way traffic determiner 132 determines that the road on which the own vehicle M is predicted to be traveling or travel in future is the one-way traffic road and determines that the own vehicle M is traveling in the reverse direction on a one-way traffic road or travels in the reverse direction on a one-way traffic road on which the own vehicle M travels in future, the automated driving start controller 127 determines that the recognizer 130, the action plan generator 140, and the second controller 160 do not start the automated driving control.

When the one-way traffic determiner 132 determines that the road on which the own vehicle M is predicted to be traveling or travel in future is the one-way traffic road and determines that the own vehicle M is predicted to be traveling in the reverse direction on a one-way traffic road and travel in the reverse direction on a one-way traffic road on which the own vehicle M travels in future even in a case in which the automated driving control is set in advance to start automatically, for example, at a time point at which the occupant ends a manual driving operation, the automated driving start controller 127 determines not to start the automated driving control. Thus, it is possible to curb start of inappropriate automated driving. As a result, when the automated driving start controller 127 determines not to start the automated driving control, an operation on the automated driving start switch 32 is invalidated.

Figure 6:
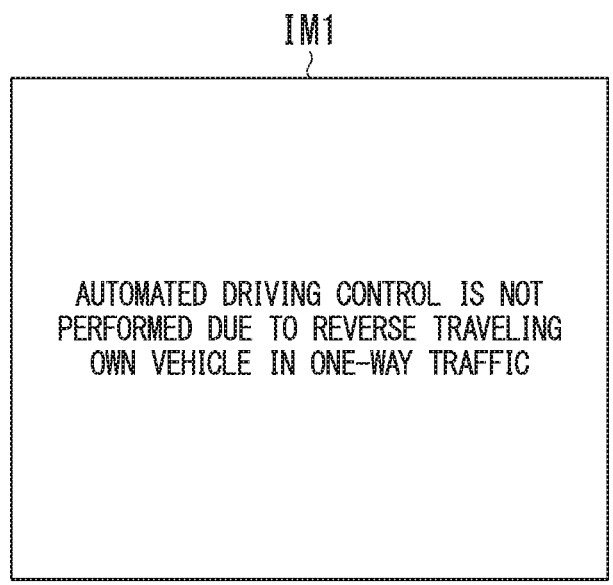
FIG. 6 is a diagram illustrating an example of an image IM1 indicating that automated driving control is not started.

When the automated driving control is not started by the automated driving start controller 127, the notification controller 128 notifies the occupant of information indicating that the automated driving control is not started. The notification controller 128 displays, for example, an image indicating that the automated driving control is not started on a display device of the HMI 30. FIG. 6 is a diagram illustrating an example of an image IM1 indicating that automated driving control is not started. When the occupant intention detector 126 detects an intention of the occupant to perform the automated driving and the automated driving start controller 127 does not start the automated driving, the notification controller 128 causes the display device to display the image IM1 indicating that the automated driving is not started due to reverse traveling in the one-way traffic. The notification controller 128 may output a sound or a warning from a speaker along with the image IM1. Thus, the occupant can easily ascertain that the automated driving is not started and the reason why the automated driving is not started.

After the image IM1 indicating that the automated driving control is not started is displayed on the display device and a predetermined time passes or when the automated driving control can be started after the display of the image IM1, the notification controller 128 ends the display of the image IM1.

The action plan generator 140 includes, for example, a contact avoidance driving controller 142. The contact avoidance driving controller 142 generates a target trajectory in which the automated driving control is not performed by the one-way traffic determiner 132 due to reverse traveling of the own vehicle M on the one-way traffic road and a contact with an oncoming vehicle is avoided when an oncoming vehicle approaches. The oncoming vehicle is an example of an object.

Figure 7:
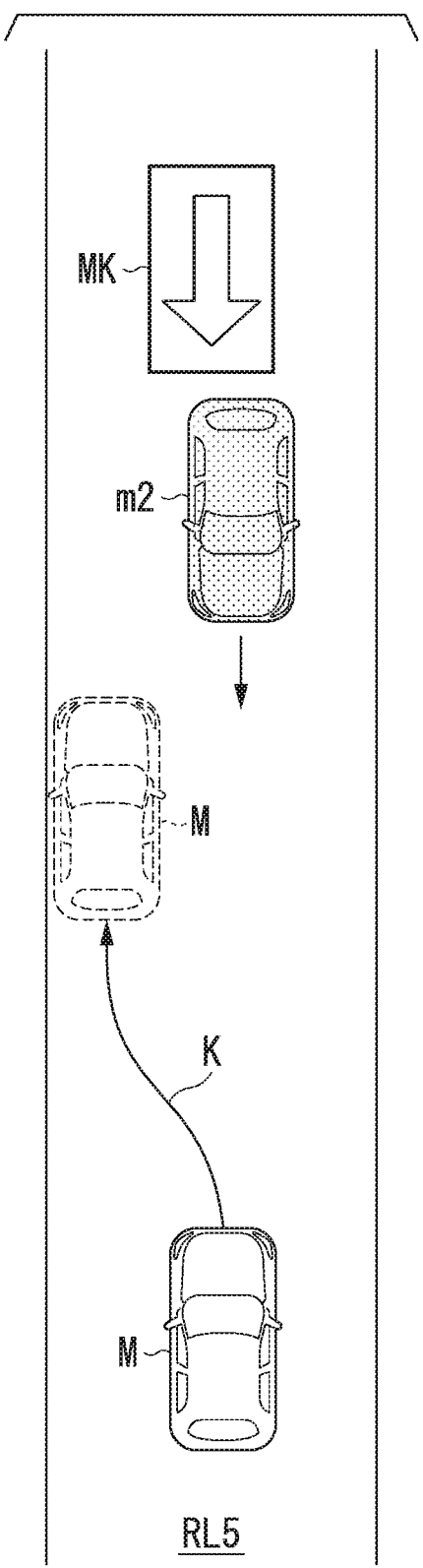
FIG. 7 is a diagram illustrating generation of a target trajectory K for avoiding a contact with an oncoming vehicle m2.

FIG. 7 is a diagram illustrating generation of a target trajectory K for avoiding a contact with an oncoming vehicle m2. The example of FIG. 7 shows an aspect in which the own vehicle M is traveling in the reverse direction on a road link RL5 and an oncoming vehicle m2 is approaching. The contact avoidance driving controller 142 calculates a probability of a future contact between the own vehicle M and the oncoming vehicle m2 from a relative distance and a relative speed between the own vehicle M and the oncoming vehicle m2 recognized by the recognizer 130. For example, the contact avoidance driving controller 142 calculates a contact probability of the own vehicle M and the oncoming vehicle m2 by using a function in which a contact probability increases as the relative distance becomes shorter or a function in which a contact probability increases as the relative speed becomes higher. For example, the function is a function of dividing the relative speed by the relative distance.

The contact avoidance driving controller 142 determines whether the calculated probability is equal to or greater than a third predetermined value. The third predetermined value is, for example, a fixed value such as about 50%. When a probability of a contact between the own vehicle M and the oncoming vehicle m2 is equal to or greater than the third predetermined value, the contact avoidance driving controller 142 generates the target trajectory K so that the probability is lowered. For example, the contact avoidance driving controller 142 generates the target trajectory K in which the own vehicle M is biased to the left road side of the road link RL5 before the own vehicle M passes by the oncoming vehicle m2 so that the oncoming vehicle m2 passes by without coming into contact with the own vehicle M. Further, the contact avoidance driving controller 142 may generate the target trajectory K in which the own vehicle M is stopped at a time point at which the own vehicle M passes by the oncoming vehicle m2.

The target trajectory K generated by the contact avoidance driving controller 142 is output to the second controller 160. The second controller 160 causes the own vehicle M to travel along the target trajectory K generated by the contact avoidance driving controller 142.

In this way, when there is the oncoming vehicle m2 for which the probability of the contact with the own vehicle M is determined to be high, the target trajectory K for avoiding the contact is generated so that the probability of the contact is lowered and the driving control of the own vehicle M is performed based on the generated target trajectory K as an example of second driving control. The second driving control is considered to be temporary automated driving control, but is not automated driving control continuously performed since a driving state is returned to the manual driving state after stopping. In the second driving control, the own vehicle M may merely stop without performing steering. In this case, after the own vehicle M stops, the occupant performs an operation of avoiding the oncoming vehicle m2 by manual driving.

The contact avoidance driving controller 142 may perform traveling support to avoid the contact with the oncoming vehicle m2 by activating another driving supporter (not illustrated) different from the recognizer 130, the action plan generator 140, and the second controller 160 as the second driving control. In this case, the driving supporter controls one or both of steering and an acceleration or deceleration speed of the own vehicle M based on the relative position and the relative speed with respect to the oncoming vehicle m2 and performs driving support to move the own vehicle M in a direction away from the oncoming vehicle m2 or decelerate or stop the own vehicle M. Thus, when the own vehicle M is traveling in the reverse direction in one-way traffic, it is possible to curb the contact with the oncoming vehicle m2 through the second driving control.

When the second driving control is performed along the target trajectory K generated by the contact avoidance driving controller 142, the notification controller 128 may notify the occupant of information indicating that the second driving control is being performed. Thus, the occupant can easily ascertain that the driving control for avoiding a contact is performed.

[Process Flow]

Figure 8:
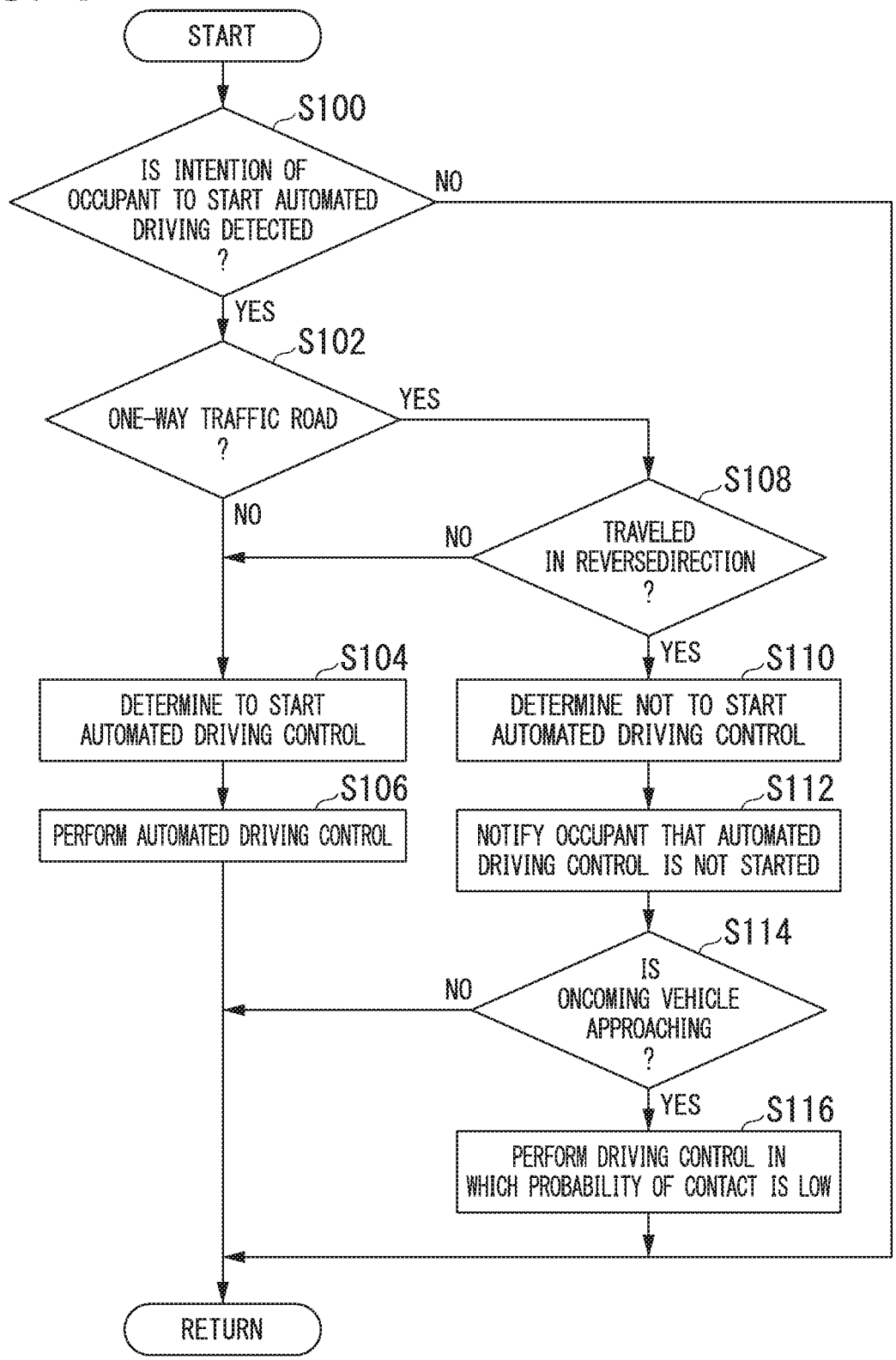
FIG. 8 is a flowchart illustrating an example of a process performed by an automated driving controller 100 according to an embodiment.

FIG. 8 is a flowchart illustrating an example of a process performed by an automated driving controller 100 according to an embodiment. The process of the flowchart may be performed, for example, at predetermined time intervals or at predetermined times repeatedly. The process of the flowchart indicates a process performed by the own vehicle M during manual driving.

First, the occupant intention detector 126 determines whether the intention of the occupant to start the automated driving is detected (step S100). When the intention of the occupant to start the automated driving is detected, the one-way traffic determiner 132 determines whether the road on which the own vehicle M is predicted to be traveling or travel in future is a one-way traffic road (step S102). When it is determined that the road is not the one-way traffic road, the automated driving start controller 127 determines to start the automated driving control (step S104) and causes the second controller 160 to perform the automated driving control (the first driving control) based on the target trajectory generated by the action plan generator 140 (step S106).

Conversely, when it is determined that the road is the one-way traffic road, the one-way traffic determiner 132 determines whether the own vehicle M is traveling in the reverse direction or travels in future in one-way traffic (step S108). When it is determined that the own vehicle M is not traveling in the reverse direction in one-way traffic and does not travel in future, the automated driving start controller 127 determines to start the automated driving control (step S104) and causes the second controller 160 to perform the automated driving control (the first driving control) based on the target trajectory generated by the action plan generator 140 (step S106).

Conversely, when it is determined that the own vehicle M is traveling in the reverse direction in one-way traffic or travels in future, the automated driving start controller 127 determines not to start the automated driving control and continues the manual driving (step S110). In this case, the notification controller 128 notifies the occupant of information indicating that the automated driving control is not started (step S112).

Subsequently, the contact avoidance driving controller 142 determines whether an oncoming vehicle is approaching in a state in which the own vehicle M is traveling in the reverse direction in one-way traffic through the manual driving (step S114). When the contact avoidance driving controller 142 determines that the oncoming vehicle is approaching, the contact avoidance driving controller 142 performs the automated control (the second driving control) in which a probability of a contact with an oncoming vehicle is low (step S116). Thus, the process of the flowchart ends.

When it is determined in the process of step S114 that the oncoming vehicle is not approaching or the intention of the occupant to start the automated driving is not detected in the process of step S100, the process of the flowchart ends as it is.

In the embodiment, the automated driving start controller 127 ends the automated driving control which is being performed, for example, when an operation of ending the automated driving control which is being performed is received through the automated driving start switch 32 or the like in a state in which the automated driving controller 100 performs the automated driving control.

According to the above-described embodiment, when the intention of the occupant to switch from the manual driving to the automated driving is detected, it can be determined more appropriately whether to start the automated driving by causing the one-way traffic determiner 132 to determine whether to start the automated driving control based on whether the road on which the own vehicle M is predicted to be traveling or travel in future is a one-way traffic road.

Modification Examples

In the above-described embodiment, when the automated driving start controller 127 determines that the own vehicle M is traveling in the reverse direction on the one-way traffic road or travels in the reverse direction in future and the second controller 160 determines not to start the automated driving control, the operation of the occupant on the automated driving start switch 32 is invalidated. The present invention is not limited thereto. An operation of an occupant on the automated driving start switch 32 is not immediately validated, but the operation may be considered to enter a state of validation (a so-called suspended state) when a start condition of the automated driving control is established after the operation.

In this case, the automated driving start controller 127 determines to start the automated driving control at a timing at which a state in which the own vehicle M is traveling in the reverse direction on a road is switched to a state in which the own vehicle M is not traveling in the reverse direction or a timing at which the road on which the own vehicle M travels in future is switched to a road on which the own vehicle M does not travel in the reverse direction. That is, the automated driving starts at a timing at which the reverse traveling state is resolved by the manual driving.

[Process Flow]

Figure 9:
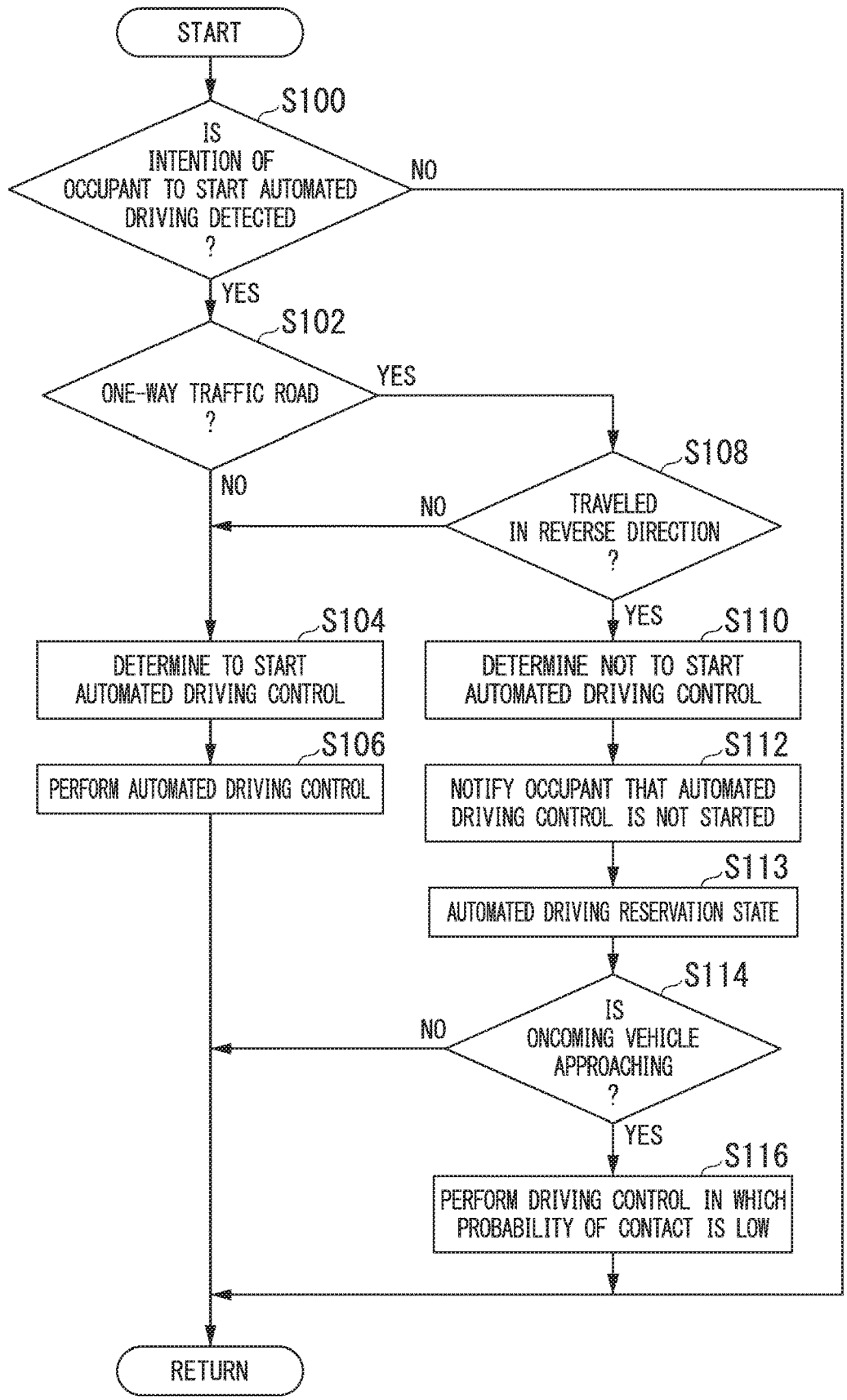
FIG. 9 is a flowchart illustrating another example of the process performed by the automated driving controller 100 according to an embodiment.

FIG. 9 is a flowchart illustrating another example of the process performed by the automated driving controller 100 according to an embodiment. The process of the flowchart may be performed, for example, at a predetermined period or a predetermined timing repeatedly. The process of the flowchart indicates a process performed by the own vehicle M during the manual driving. In the process illustrated in FIG. 9, a process of step S113 is added between the processes of steps S112 and S114, compared to the process illustrated in FIG. 8. Accordingly, in the following process, a process of step S113 will be described mainly.

When it is determined in the process of step S108 that the own vehicle M is traveling in the reverse direction in one-way traffic or travels in future, the automated driving start controller 127 determines not to start the automated driving control and causes the manual driving to continue (step S110). The notification controller 128 notifies the occupant of information indicating that the automated driving control is not started (step S112). Then, the automated driving start controller 127 performs an automated driving reservation state (a suspended state) in which the operation of the occupant on the automated driving start switch 32 is not immediately validated and is validated when the start condition of the automated driving control is established after the operation (step S113), and performs the process subsequent to step S114.

Thus, when the process of the flowchart illustrated in FIG. 9 is performed repeatedly, the processes subsequent to step S102 can be performed by detecting the intention of the occupant to start the automated driving without performing the determination process of step S100 in a case in which the own vehicle M is in the automated driving reservation state as a start time point of the process. Accordingly, since the occupant can start the automated driving without repeating the operation or the like on the automated driving start switch 32, it is possible to reduce an operation burden on the occupant.

In the above-described embodiment, the one-way traffic determiner 132 determines whether the own vehicle M is traveling in the reverse direction on the one-way traffic road or travels in the reverse direction in future. However, instead of this, for example, it may be determined whether the own vehicle M is traveling in the reverse direction on a total two-lane road of single lanes or the like which is not a one-way traffic road. In this case, when the intention of the occupant to switch to an automated driving state is detected, the one-way traffic determiner 132 determines, as a determiner, whether the own vehicle M is traveling in the reverse direction or travels in the reverse direction in future and determines whether to start the automated driving control based on a determination result. For example, when it is determined that the own vehicle M is traveling in the reverse direction or travels in the reverse direction in future, the automated driving start controller 127 determines not to start the automated driving control of the own vehicle M. Conversely, when it is not determined that the own vehicle M is traveling in the reverse direction or travels in the reverse direction in future, the automated driving start controller 127 determines to start the automated driving control of the own vehicle M.

[Hardware Configuration]

Figure 10:
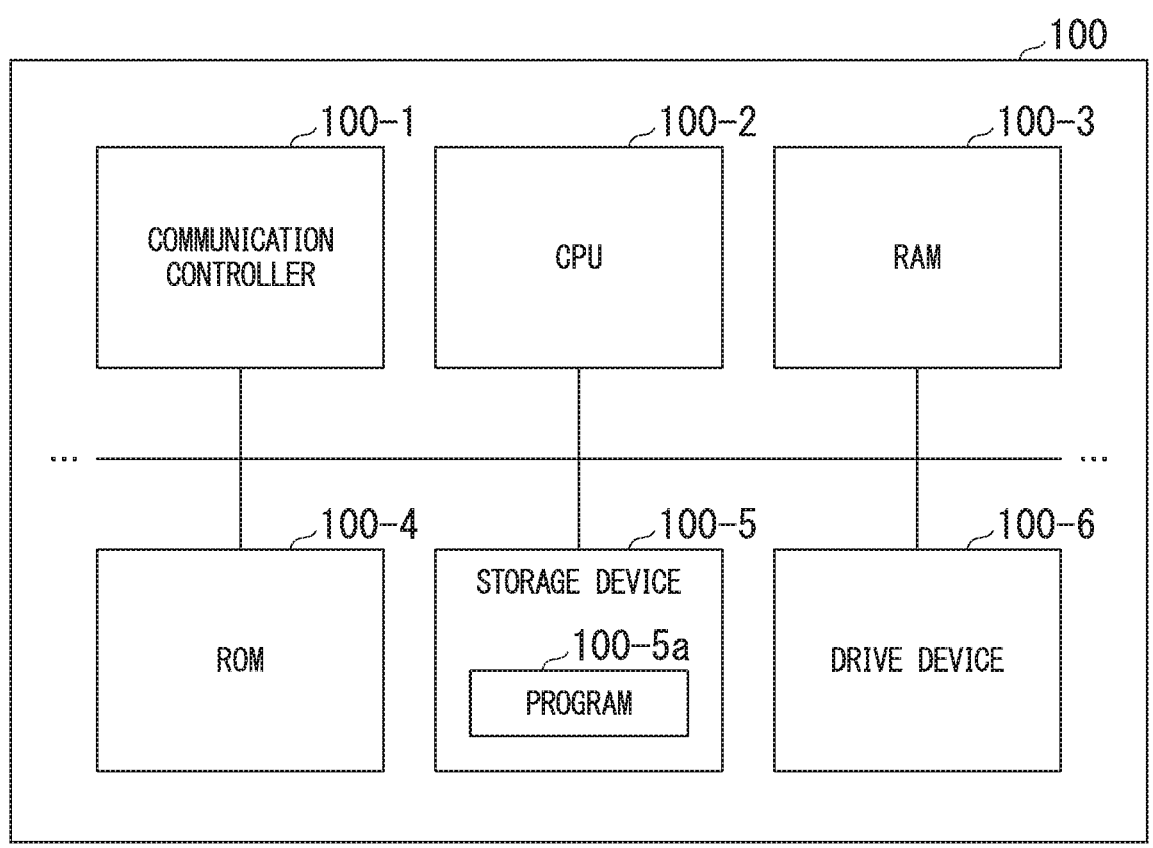
FIG. 10 is a diagram illustrating an example of a hardware configuration of the automated driving controller 100 according to an embodiment.

The automated driving controller 100 according to the above-described embodiment is realized by, for example, a hardware configuration illustrated in FIG. 10. FIG. 10 is a diagram illustrating an example of a hardware configuration of the automated driving controller 100 according to an embodiment.

The automated driving controller 100 is configured such that a communication controller 100-1, a CPU 100-2, a RAM 100-3, a ROM 100-4, a secondary storage device 100-5 such as a flash memory or an HDD, a drive device 100-6, and the like are connected to each other via an internal bus or a dedicated communication line. A portable storage medium such as an optical disc is mounted on the drive device 100-6. A program 100-5*a* stored in the secondary storage device 100-5 is loaded on the RAM 100-3 by a DMA controller (not illustrated) and is executed by the CPU 100-2 to realize the first controller 120 and the second controller 160. A program which is referred to by the CPU 100-2 may be stored in the portable storage medium mounted on the drive device 100-6 or may be downloaded from another device via a network NW.

The above-described embodiment can be expressed as follows:

a vehicle control device including a storage device that stores information and a hardware processor that executes a program stored in the storage device, the hardware processor executing the program stored in the storage device, a driving controlling process of performing first driving control such that one or both of an acceleration or deceleration speed and steering of a vehicle is controlled to travel the vehicle irrespective of an operation of an occupant of the vehicle;

an occupant intention detecting process of detecting an intention of the occupant to switch from manual driving to a state in which the first driving control is performed through the driving controlling operation; and a one-way traffic determining process of determining whether a road on which the vehicle is predicted to be traveling or travel in future is a one-way traffic road, wherein, in the driving controlling process, it is determined whether to start the first driving control based on whether, through the one-way traffic determining process, to determine whether the road on which the vehicle is predicted to be traveling or travel in future is the one-way traffic road when the intention of the occupant to switch to the state in which the first driving control is performed through the driving controlling process is detected through the occupant intention detecting process.

The embodiments for carrying out the present invention have been described above, but the present invention is not limited to the embodiments. Various modifications and substitutions can be made within the scope of the present invention without departing from the gist of the present invention.

REFERENCE SIGNS LIST

1 Vehicle system
10 Camera
12 Radar device
14 Finder
16 Object recognition device
20 Communication device
30 HMI
32 Automated driving start switch
40 Vehicle sensor
50 Navigation device
60 MPU
80 Driving operator
100 Automated driving controller
120 First controller
125 Master controller
126 Occupant intention detector
127 Automated driving start controller
128 Notification controller
130 Recognizer
132 One-way traffic determiner
140 Action plan generator
142 Contact avoidance driving controller
160 Second controller
200 Travel driving power output device
210 Brake device
220 Steering device
M OWN vehicle

What is claimed is:

1. A vehicle control device, comprising:
a processor that executes instructions to:
perform first driving control such that one or both of an acceleration or deceleration speed and steering of a vehicle is controlled to travel the vehicle irrespective of an operation of an occupant of the vehicle;
detect an intention of the occupant to switch from manual driving to a state in which the driving controller performs the first driving control; and
determine whether the vehicle is traveling in a reverse direction or travels in the reverse direction in future, on a one-way traffic road,
wherein the processor does not start the first driving control when the processor detects the intention of the occupant to switch to the state in which the processor performs the first driving control and the processor determines that the vehicle is traveling in the reverse direction or travels in the reverse direction in future, on the one-way traffic road,
when the vehicle approaches an oncoming vehicle traveling on the one-way traffic road in a state in which the processor determines that the first driving control does not start due to the determination that the vehicle is traveling in the reverse direction or travels in the reverse direction in future on the one-way traffic road, the processor performs second driving control such that a contact between the vehicle and the oncoming vehicle is avoided.

2. The vehicle control device according to claim 1, the processor further executes instructions to:
notify the occupant that the first driving control is not started when the driving controller determines not to start the first driving control since the determiner determines that the vehicle is traveling in the reverse direction.

3. The vehicle control device according to claim 1, wherein, even in a case in which the first driving control is set to start automatically at a time point at which a manual driving operation by the occupant ends, the processor does not start the first driving control when the processor determines that the vehicle is traveling in the reverse direction or travels in the reverse direction in future.

4. A vehicle control method, comprising:
controlling, by a processor, one or both of an acceleration or deceleration speed and steering of a vehicle to travel the vehicle irrespective of an operation of an occupant of the vehicle;
detecting, by the processor, an intention of the occupant to switch from manual driving to a state in which the processor performs the first driving control; and
determining, by the processor, whether the vehicle is traveling in a reverse direction or travels in the reverse direction in future, on a one-way traffic road,
wherein the processor does not start the first driving control when the processor detects the intention of the occupant to switch to the state in which the processor performs the first driving control and the determines that the vehicle is traveling in a reverse direction or travels in the reverse direction in future, on the one-way traffic road,
when the vehicle approaches an oncoming vehicle traveling on the one-way traffic road in a state in which the processor determines that the first driving control does not start due to the determination that the vehicle is traveling in the reverse direction or travels in the reverse direction in future on the one-way road, the processor performs second driving control such that a contact between the vehicle and the oncoming vehicle is avoided.

5. A non-transitory computer-readable storage medium that stores a program to be executed by a vehicle computer to perform at least:

perform first driving control such that one or both of an acceleration or deceleration speed and steering of a vehicle is controlled to travel the vehicle irrespective of an operation of an occupant of the vehicle, detect an intention of the occupant to switch from manual driving to a state in which the driving controller performs the first driving control; and determine whether the vehicle is traveling in a reverse direction or travels in the reverse direction in future, on a one-way traffic road, not start the first driving control when the intention of the occupant to switch to the state in which the driving controller performs the first driving control is detected and the vehicle is determined to be traveling in a reverse direction or travel in the reverse direction in future, on the one-way traffic road, when the vehicle approaches an oncoming vehicle traveling on the one-way traffic road in a state in which it is determined that the first driving control does not start due to the determination that the vehicle is traveling in the reverse direction or travels in the reverse direction in future on the one-way road, performing second driving control such that a contact between the vehicle and the oncoming vehicle is avoided.

* * * * *